Patented Sept. 23, 1930

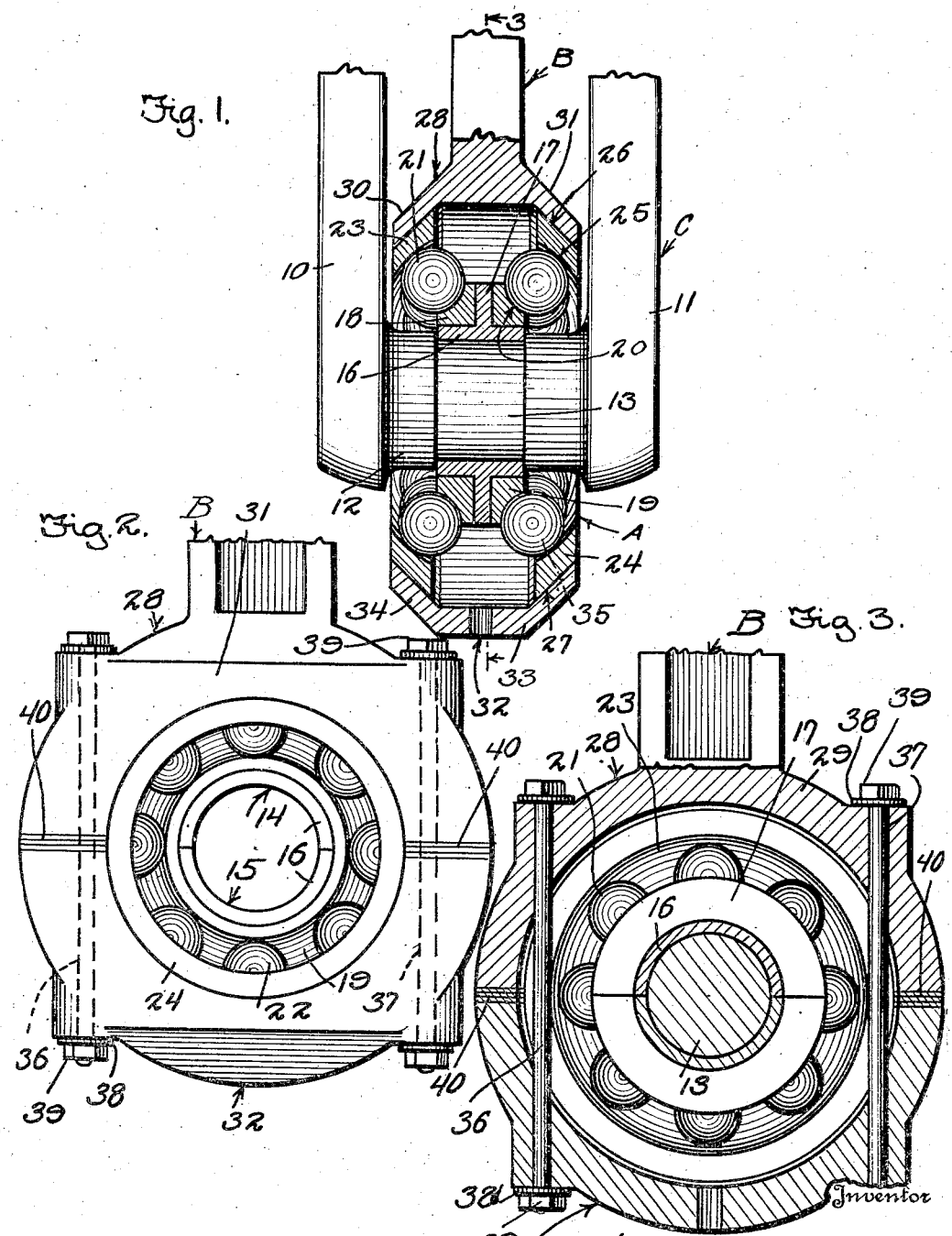

1,776,747

UNITED STATES PATENT OFFICE

FREDERICK C. BANTIN, OF SALAMANCA, NEW YORK

BALL-BEARING CONNECTION

Application filed July 14, 1926. Serial No. 122,477.

This invention appertains generally to new and useful improvements in ball bearing assemblies and has more particular reference to a novel and efficient ball bearing connection designed primarily for securing a connecting rod to the crank pin of a crank shaft.

An important object of the present invention is to provide an improved ball bearing connection of the above character so constructed that the amount of friction between the various parts will be reduced to a minimum.

Another important object of the present invention is to provide such an improved ball bearing connection which is capable of being easily and quickly adjusted so that any loose play existing between the various parts may be readily taken up.

Another object of the invention is the provision of such an improved ball bearing connection which consists of a minimum number of parts, all of which may be readily assembled and disassembled relative to one another so that any worn or broken parts may be easily and quickly renewed.

Another object of the invention is the provision of such an improved ball bearing connection having incorporated therewith means for effectively preventing any lateral movement of the connecting rod relative to the crank shaft.

A further object of the present invention is to provide such an improved ball bearing connection which, while simple in construction, is nevertheless, strong, sturdy and durable, one which is practical and efficient in its operation, and one which can be manufactured and placed upon the market at a reasonable cost.

Numerous other objects and advantages of the present invention will become more readily apparent during the course of the following description when taken in connection with the accompanying drawings.

In the drawings forming a part of this application:

Figure 1 is a vertical transverse central sectional view through an improved ball bearing connection constructed in accordance with the present invention and showing the manner in which the same is utilized to secure a connecting rod to the crank pin of a crank shaft.

Figure 2 is a side elevation of the ball bearing assembly removed from the crank shaft.

Figure 3 is a vertical sectional view taken on the line 3—3 of Figure 1.

Figure 4 is a view similar to Figure 1 showing a somewhat modified type of ball bearing connection.

Figure 5 is a side elevation of the form of the invention shown in Figure 4 removed from the crank shaft.

Figure 6 is a sectional view taken on the line 6—6 of Figure 4.

Referring now more in detail to the accompanying drawings and especially to Figures 1 to 3 inclusive, wherein has been shown one practical embodiment of the present invention, the letter A generally indicates my improved ball bearing assembly for securing the connecting rod B to the crank shaft C.

The crank shaft C is constructed with the usual throw arm comprising the spaced crank cheeks 10 and 11 and the integral crank pin 12. The crank pin 12 is of a novel construction and it will be noted that the same is reduced in diameter intermediate its ends to provide the substantially wide circumferential groove 13.

Carried by and encircling the crank pin 12 is a two-part ring comprising the upper and lower semi-circular sections 14 and 15, each of which comprises a base portion 16 arranged to snugly fit within the circumferential groove 13. Formed on the outer surface of the base portion 16 of each of said semi-circular ring sections intermediate the side edges thereof is the outwardly projecting circumferentially extending tongue 17.

Encircling the semi-circular ring sections 14 and 15 and fitted on the base portions 16 thereof at opposite sides of the tongues 17 are the inner race members or supporting rings 18 and 19 which serve to also secure the said semi-circular ring sections together. The outer corners of the said rings 18 and 19 are provided with annular grooves or recesses 20 which receive the rows of ball bearings 21 and 22. The rings 18 and 19 are applied by slipping them over the crank shaft C from one end or the opposite ends thereof.

Arranged to be slipped over the opposite ends of the crank shaft C are the outer race members or retaining rings 23 and 24, the inner faces thereof being bevelled as at 25 and adapted to engage the rows of ball bearings 21 and 22 while the outer side faces of the upper and lower portions of the said retaining rings are bevelled as at 26 and 27 for a purpose which will be more clearly hereinafter described.

For the purpose of securing the retaining rings 23 and 24 in position, the lower end of the connecting rod B is provided with a cap 28 comprising the semi-circular top wall 29 and the divergent side walls 30 and 31, the inner surfaces of which snugly engage the upper outer bevelled faces 26 of the retaining rings 23 and 24.

A bottom cap 32 similar to the cap 28 is also provided and comprises the semi-circular bottom wall 33 and the divergent side walls 34 and 35, the inner surfaces of said side walls snugly engaging the lower outer bevelled faces 27 of the retaining rings 23 and 24.

Passing through the caps 28 and 32 between the rows of ball bearings 21 and 22 are the securing bolts 36 and 37, each having received upon its free end a washer 38 and a nut 39. Arranged between the caps 28 and 32 are a plurality of shims 40 and when it is desired to take up any loose play which may exist between the various parts, one or more of the said shims may be removed and the nuts 39 tightened so as to bring the said caps closer together thereby forcing the retaining rings 23 and 24 inwardly towards one another, by sliding up or down the beveled outer surfaces of the retaining rings 23 and 24.

When securing the connecting rod B to the crank pin 12 of the crank shaft C, the semi-circular ring sections 14 and 15 are first placed in position so that the base portions 16 thereof are received within the circumferential groove 13 in the crank pin as hereinabove described. The ball bearings supporting rings 18 and 19 are then slipped over the crank shaft from one or both ends thereof and placed over or around the said ring sections 14 and 15 after which the retaining rings 23 and 24 are slipped over the crank shaft from one or both ends thereof. The ball bearings 21 and 22 are then positioned between the said retaining rings 23 and 24 and the supporting rings 18 and 19 after which the said retaining rings are firmly clamped in position by means of the caps 28 and 32. Thus, it will be appreciated that the various parts are firmly clamped in position relative to one another, and that any loose play existing between the parts may be readily taken up. Also, any lateral movement of the connecting rod relative to the crank pin is prevented. It is also to be noted that by positioning the securing bolts 36 and 37 between the rows of bearings 21 and 22, the outside diameter of the assembled ball bearing connection is considerably reduced.

In Figures 4 to 6 inclusive, has been shown a somewhat modified form of the present invention and wherein the letter A generally indicates the improved ball bearing assembly for securing the connecting rod E to the crank shaft F. The crank shaft F includes the usual crank or throw arm 42 having the integral crank pin 43 formed with a central cylindrical portion 44 which tapers towards its opposite ends, so that the outer ends of the said crank pin 43 are of a less diameter than the central cylindrical portion 44 thereof. The central cylindrical portion 44 is provided with a circumferential groove 45 and the diameter of the crank pin 43 is purposely made larger at its center in order to compensate for the said groove and also to facilitate the assembly of the bearing thereon.

Fitted within the circumferential groove 45 formed in the crank pin 43 is a split resilient ring 46 and encircling the central cylindrical portion 44 of said crank pin at opposite sides of the ring 46 are the outer race members or supporting rings 47 and 48 provided at their inner corners with grooves 49 for fitting over the ring 46 while their outer corners are provided with annular grooves or recesses 50 for receiving the rows of ball bearings 51 and 52.

This form of the invention also embodies the outer race members or retaining rings 53 and 54 which are secured in position by means of the top cap 55 carried by the lower end of the connecting rod E and the bottom cap 56. The retaining rings 53 and 54 are of the same construction as the retaining rings 23 and 24 described hereinabove in connection with the form of the invention disclosed in Figures 1 to 3 inclusive. However, in this form of the invention, the semi-circular top walls of the caps 55 and 56 are provided at their opposite ends with outwardly projecting ears 57 and 58 adapted to aline with one another and through which are inserted the securing bolts 59 upon which are received the washers 60 and nuts 61. Arranged on the securing bolts 59 between the ears 57 and 58 are a plurality of shims 62.

When securing the connecting rod E to the crank shaft F, the split resilient ring 46 is first fitted within the circumferential groove 45 in the crank pin after which the ball bearing supporting rings 47 and 48 are placed in position as set forth hereinabove. The retaining rings 53 and 54 are then slipped over the opposite ends of the crank shaft and the ball bearings 51 and 52 are then placed in position between the said supporting rings and the retaining rings. The said retaining rings are then firmly clamped in position by means of the caps 55 and 56. Should it be desired to take up any loose play existing between the various parts, one or more of the shims 62 may be removed and the nuts 60 tightened whereby to force the retaining rings 53 and 54 inwardly by sliding up or down the beveled outer surfaces of the rings 53 and 54.

While the foregoing description has been confined to the use of the present invention in association with a connecting rod, it is of course to be understood that with a few minor changes, the same may be readily adapted for use as a main bearing.

Changes in the details of construction may be resorted to without departing from or sacrificing the spirit of the invention so long as such changes fall within the scope of the appended claim.

What is claimed is:

In combination, a member having a circumferentially extending groove, a ring positioned in the groove and projecting radially beyond the member, inner race members surrounding said first member and contacting therewith at opposite sides of the ring, the race members being provided with inner grooves for the reception of the projecting portion of the ring and contacting with each other radially beyond the ring, outer race members, anti-friction elements arranged between the race members, and retaining means surrounding the outer race members.

In testimony whereof I affix my signature.

FREDERICK C. BANTIN.